(12) United States Patent
Sethi

(10) Patent No.: US 12,411,674 B2
(45) Date of Patent: Sep. 9, 2025

(54) DELIVERING APPLICATIONS TO CLIENT MACHINES IN THIRD-PARTY ENVIRONMENTS

(71) Applicant: Omnissa, LLC, Mountain View, CA (US)

(72) Inventor: Aman Sethi, Sunnyvale, CA (US)

(73) Assignee: Omnissa, LLC, Mountain View, CA (US)

( * ) Notice: Subject to any disclaimer, the term of this patent is extended or adjusted under 35 U.S.C. 154(b) by 192 days.

(21) Appl. No.: 18/464,178

(22) Filed: Sep. 8, 2023

(65) Prior Publication Data

US 2025/0085949 A1    Mar. 13, 2025

(51) Int. Cl.
*G06F 8/61* (2018.01)
*G06F 8/60* (2018.01)
*G06F 9/54* (2006.01)

(52) U.S. Cl.
CPC .................. *G06F 8/61* (2013.01); *G06F 8/60* (2013.01); *G06F 9/547* (2013.01)

(58) Field of Classification Search
None
See application file for complete search history.

(56) References Cited

U.S. PATENT DOCUMENTS

| | | | | |
|---|---|---|---|---|
| 2003/0145316 A1* | 7/2003 | McKinlay | ........... | G06F 9/44526 717/173 |
| 2004/0083474 A1* | 4/2004 | McKinlay | ............. | G06Q 30/06 717/176 |
| 2011/0126192 A1* | 5/2011 | Frost | .......................... | G06F 8/61 717/178 |
| 2012/0036496 A1* | 2/2012 | Yang | ................... | G06F 9/44526 717/121 |
| 2013/0145361 A1* | 6/2013 | Kaegi | ..................... | G06F 9/445 717/176 |
| 2016/0004527 A1* | 1/2016 | Udd | .......................... | G06F 8/65 717/172 |
| 2016/0048382 A1* | 2/2016 | Xi | ............................. | G06F 8/61 717/174 |
| 2023/0133624 A1* | 5/2023 | Cajias | ..................... | G06T 11/60 715/705 |

* cited by examiner

*Primary Examiner* — Qing Chen
(74) *Attorney, Agent, or Firm* — Kim & Stewart LLP

(57) ABSTRACT

A computerized method efficiently and instantaneously delivers an application in a third-party environment. An application plugin associated with the application is published to an application publishing portal, while the application itself is stored in an application repository. The application plugin is a fraction of a size of the application. A request is received from a client machine to download the application. In response to the request, the application plugin, instead of the application, is provided to the client machine. The application plugin, comprising metadata and instructions to locate the application on the application repository, is used to make the application available to the user without installing the application on the client machine. The disclosure enables savings on network bandwidth, memory usage, and processing when delivering the application to the client machine.

20 Claims, 8 Drawing Sheets

DELIVERING APPLICATIONS TO CLIENT MACHINES IN THIRD-PARTY ENVIRONMENTS

BACKGROUND

Existing application delivery environments include an application publishing portal which stores a complete application package for delivery to end users. To install an application on the devices of the end users, the complete application package is pushed to each of the devices. This causes large downloads to be replicated on every single user device needing the application, resulting in slow application availability after user login. Because applications are often large in size (e.g., a few gigabytes), application delivery in such environments consumes significant computing resources including bandwidth and storage. For example, after delivery, a separate copy of the application exists on each of the devices.

Further, many application delivery environments that publish applications for delivery to an end user do not provide an application management console to facilitate operability with different application managers and different application formats.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In some examples, a computerized method for efficiently and instantaneously (e.g., in almost real-time) delivering applications to client machines in a third-party application publishing environment is provided. An application manager on a client machine sends a request to download an application from an application publishing portal. In response, the application publishing portal provides an application plugin associated with the application. The application itself is stored in an application repository. The application plugin is a fraction of a size of the actual application, and comprises metadata and instructions to locate the application on the application repository. On receipt of the application plugin associated with the application, one or more of the metadata and the instructions in the application plugin are used to make the application available to the user using on-demand delivery (e.g., virtually, without downloading the application to the client machine). Thus, examples of the disclosure enable savings on network bandwidth, memory usage, and processing associated with accessing the application on the client machine.

BRIEF DESCRIPTION OF THE DRAWINGS

The present description will be better understood from the following detailed description read considering the accompanying drawings, wherein:

Corresponding reference characters indicate corresponding parts throughout the drawings. In FIGS. 1 to 6, the systems are illustrated as schematic drawings. The drawings may not be to scale. Any of the figures may be combined into a single example or embodiment.

DETAILED DESCRIPTION

Figure 1:
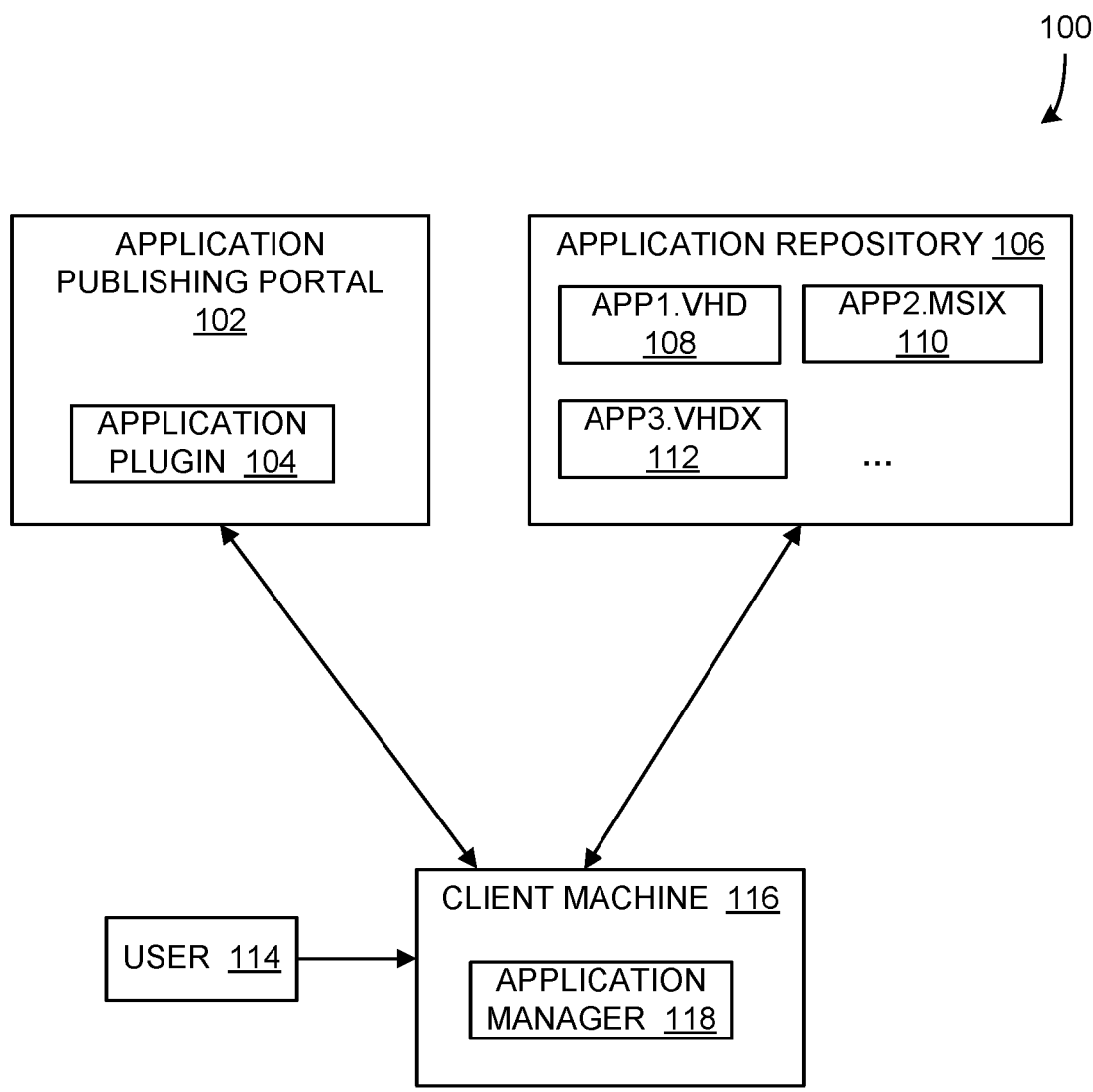
FIG. 1 illustrates an example architecture that advantageously delivers applications in third-party application publishing environments.

In existing systems, an application publishing portal (e.g., Google Workspace, Microsoft Intune, and the like) is used to deliver a full application to a client machine, and the client machine installs the full application received from the application publishing portal. An application manager (e.g., VMware App Volumes) may not have management control over a particular application publishing portal (e.g., a third-party application publishing portal). In such a third-party environment, the application manager and the application publishing portal are different entities or parties. Aspects of the disclosure enable a fast and efficient way to deliver applications to client machines by downloading an application plugin from a third-party application publishing portal instead of the application itself.

The application plugin, for the application, is created by an application packager in a format supported or otherwise accepted by the application publishing portal. The application plugin is a collection of metadata and instructions related to the application (but without the actual application). While the application plugin is packaged in a format that the third-party application publishing portal uses for publishing applications, the application itself is stored in the application repository. For example, if the format required by the application publishing portal is an .msi format or .intunewin format, the application packager of the disclosure creates an application plugin in that required format. The application plugin is very lightweight and small in size, as it is not the application itself. The application plugin is accepted and published on the application publishing portal as if it were a regular, full application, because the application plugin appears to be a regular, full application to the application publishing portal. Further, the application plugin is assigned to particular users just like a regular application is assigned to users on the application publishing portal. The metadata and instructions are designed in a way that when the application plugin is processed on the client machine (e.g., an end user machine), the application plugin makes the regular, full application available to the client machine from the application repository (e.g., not the application publishing portal) where the regular, full application is actually stored. In some examples, the application repository may be a third-party application repository that is managed by an entity or party different from the application publishing portal and/or the application manager.

The disclosure advantageously provides access to an application without actually delivering and installing the application from the application publishing portal to the client machines. Instead of the application (e.g., having a memory size of a few gigabytes (GBs)), an application plugin (e.g., having a memory size of a few kilobytes (KBs)) is delivered from the application publishing portal and processed on the client machines. The processing of the application plugin includes using the metadata and/or instructions in the application plugin to find the application on the application repository. The application is then made available to the client machine. For example, the client machine is a virtual machine, and the application is made available on the client machine virtually, on-demand. An example of on-demand delivery of an application to a client machine is VMware's App Volumes, which provides dynamic mounting of a virtual disk volume on the client machine to make the application appear as if was installed on the client machine.

In this way, aspects of the disclosure reduce consumption of (1) network bandwidth because a smaller footprint application plugin is downloaded instead of the application, and (2) an amount of memory used for making the application available on the user machines because the application is not installed in the traditional sense. This improves the functioning of the underlying computing device.

FIG. 1 is a block diagram illustrating an example system 100 that advantageously delivers applications in third-party environments. In some examples, the system 100 includes an application publishing portal 102 on which applications from developers are published. The application publishing portal 102 may be under control of a company which facilitates publication of applications from developers on the application publishing portal 102. Aspects of the disclosure submit an application plugin 104 for publication on the application publishing portal 102 just like a regular, full application is published on the application publishing portal 102. The application plugin 104 may be published in one or more formats supported by the application publishing portal 102. For example, the format of the application plugin 104 may be .intunewin or .msi, as supported by the application publishing portal 102.

Separately, the application is stored in an application repository 106. For example, the application repository 106 may store applications in different formats (e.g., APP1 108 in VHD format, APP2 110 in MSIX format, APP3 112 in VHDX format and the like). The application repository 106 may store one application in multiple, different formats (e.g., APP4 in VHD format, APP4 in VHDX format, or on any other format). In some examples, the application publishing portal and the application repository may be on different storage devices or on the same storage device.

In some examples, the request to access an application is automatically generated by the client machine upon detecting a login into the client machine by a user, because the application has been assigned to the user (e.g., associated with an access profile of the user). For example, an application manager 118 on a client machine 116 sends a request to the application publishing portal 102 to download the application (such as application 108, 110, or 112). However, the application publishing portal 102 stores the application plugin 104, and provides the application plugin 104 to the client machine 116 in response to the request. The application plugin 104 is a fraction of a size of the application. For example, the application plugin is of the order of a few KBs (e.g., around 10 KB or 20 KB) whereas the application can be of the order of a few GBs (e.g., 1 GB, 2 GB, 3 GB, or even more).

As such, in response to the request to download the application, the application plugin 104 associated with the application is received from the application publishing portal 102 by the client machine 116. The application plugin 104 comprises metadata and instructions to locate the application (such as application 108, 110, or 112) on the application repository 106. Using one or more of the metadata and the instructions, the application associated with the application plugin 104 is made available to the user 114. For example, the application is provided virtually, on-demand by mounting a virtual disk to give the appearance of installation of the application, but without actually installing the application on the client machine 116. The client machine 116 may be a virtual machine (e.g., a VM 501-508 of FIG. 5) or a computing device such as a computing apparatus 618 of FIG. 6.

Figure 2:
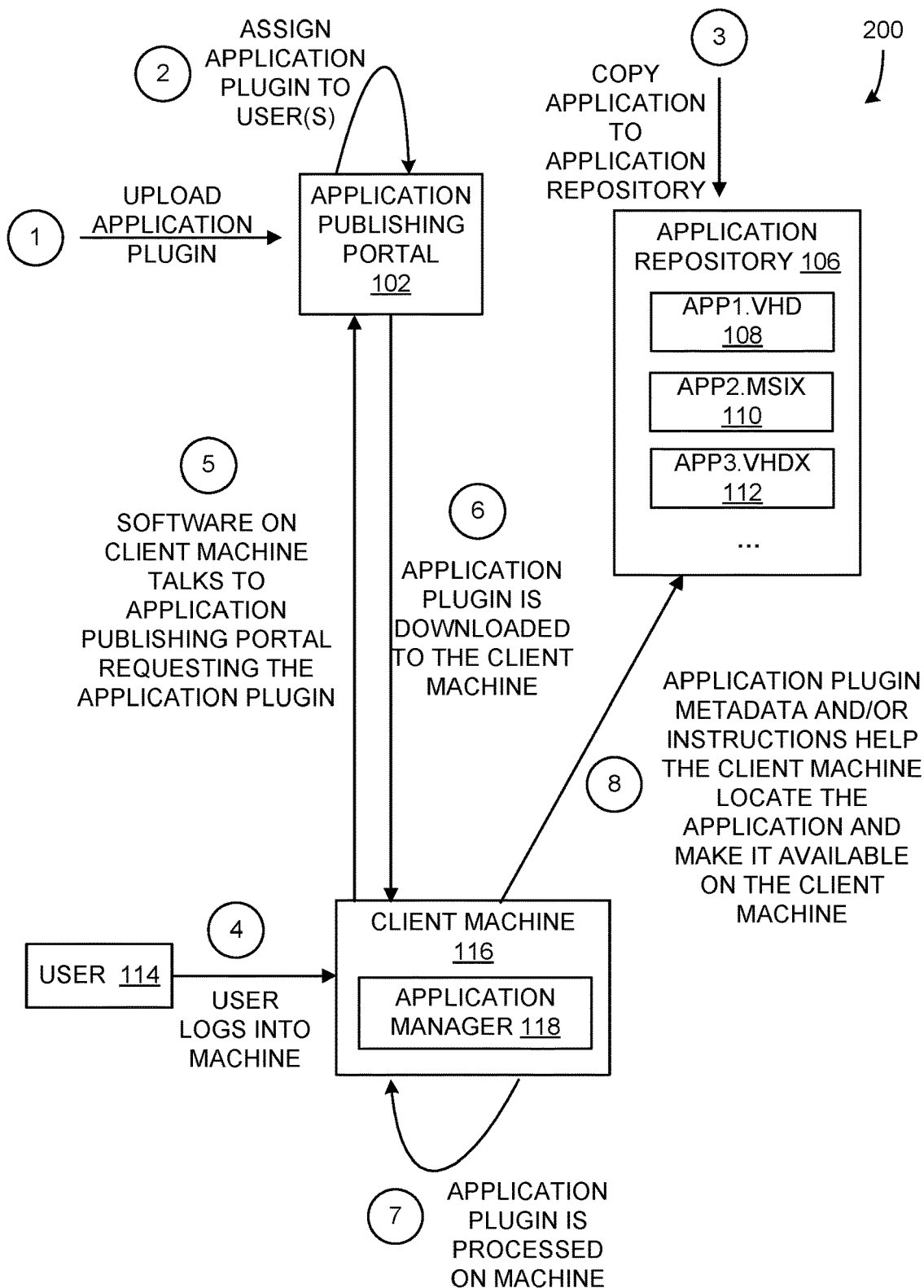
FIG. 2 is a data flow diagram illustrating example operations for delivering applications in a third-party environment, such as that of FIG. 1.

FIG. 2 illustrates a data flow diagram 200 with example operations for delivering applications in third-party environments in an example architecture such as that of FIG. 1. In Operation 1, an application plugin (such as application plugin 104) is uploaded to the application publishing portal 102. The application plugin 104, or the application associated with the application plugin, is assigned to one or more users at the application publishing portal 102 in Operation 2. The application is stored in the application repository 106 in Operation 3. For example, the applications stored in the application repository 106 may be in different formats (such as applications 108-112). When the user 114 logs into the client machine 116 in Operation 4, software, hardware, or firmware (such as the application manager 118) detects that the application (or application plugin 104) has been assigned to the user 114. In some examples, the software may periodically detect if any additional application or application plugin 104 has been assigned to the user 114.

In Operation 5, the client machine 116 sends a request to the application publishing portal 102 for the application (e.g., the application plugin 104) that has been assigned to the user 114. In Operation 6, the application plugin 104 is downloaded from the application publishing portal 102 to the client machine 116. The application plugin 104 is processed on the client machine in Operation 7. In Operation 8, the application plugin 104 including metadata and instructions locates the application in the application repository 106 (e.g., with or without the help of the application manager). The application is then made available to the user 114 on the client machine 116, such as by the application manager.

In some examples, instead of locating the application in the application repository 106, the application plugin 104 causes the application manager to locate the application on the application repository 106 using the metadata and/or instructions. For example, the application plugin 104 makes a procedure call to the application manager, and conveys the metadata and/or instructions for use by the application manager. If the application plugin 104 is not able to find the application manager, the instructions in the application plugin may be used to find the application manager from a source (such as the application publishing portal or some other source) and install the application manager on the client machine 116. Thereafter, the application manager, using the metadata and/or the instructions in the application plugin, locates the application on the application repository 106 and makes the application available to the user 114 on the client machine 116.

Figure 3A:
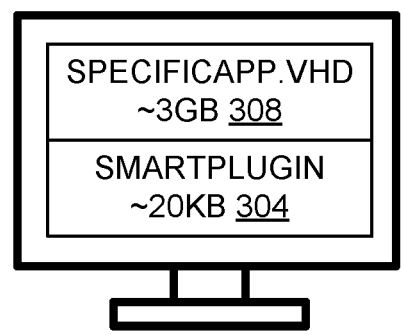
FIG. 3A illustrates application packaging in an example architecture, such as that of FIG. 1.

FIG. 3A illustrates an example of application packaging used in an example architecture, such as the architecture of FIG. 1. In existing systems, an application packager packages an application for download by creating a regular application package (e.g., in VHD format) for publishing on the application publishing portal. In contrast, in aspects of the disclosure, the application packager packages an application for download by creating a regular application package (e.g., SpecificApp.VHD 308 of around 3 GB size), but also creates an application plugin (e.g., SmartPlugin 304 of around 20 Kb size) associated with the regular application package. In this example, the SpecificApp.VHD 308 is then stored in the application repository 106, while the SmartPlugin 304 is published on the application publishing portal 102. Thus, the SmartPlugin 304, rather than the SpecificApp.VHD 308, is published on the application publishing portal 102 just like a regular application and assigned to users.

In creating the SmartPlugin 304, the application packager includes metadata and/or instructions for obtaining the SpecificApp.VHD 308. For example, the metadata describes SpecificApp.VHD 308 and includes a location of SpecificApp.VHD 308 in the application repository 106. The metadata may be in a format such as JavaScript Object Notation (JSON), Extensible Markup Language (XML), etc. The instructions in the SmartPlugin 304 comprise executable instructions that trigger execution of the application manager 118 on the client machine 116. For example, the instructions in the SmartPlugin 304 comprise executable instructions that trigger a remote procedure call (RPC) end point in the application manager 118. In operation, the application manager 118 selects, based on the RPC end point, an application format of SpecificApp.VHD 308 from the application repository 106 depending on an execution environment of the SmartPlugin 304 on the client machine 116.

In some examples, one application plugin 104 may be associated with one application. Alternatively, one application plugin 104 may be associated with a suite of applications. Another alternative is that many applications plugins 104 may be associated with a single application (e.g., each application plugin 104 being intended for a particular execution environment of the client machine), or suite of applications.

Figure 3B:
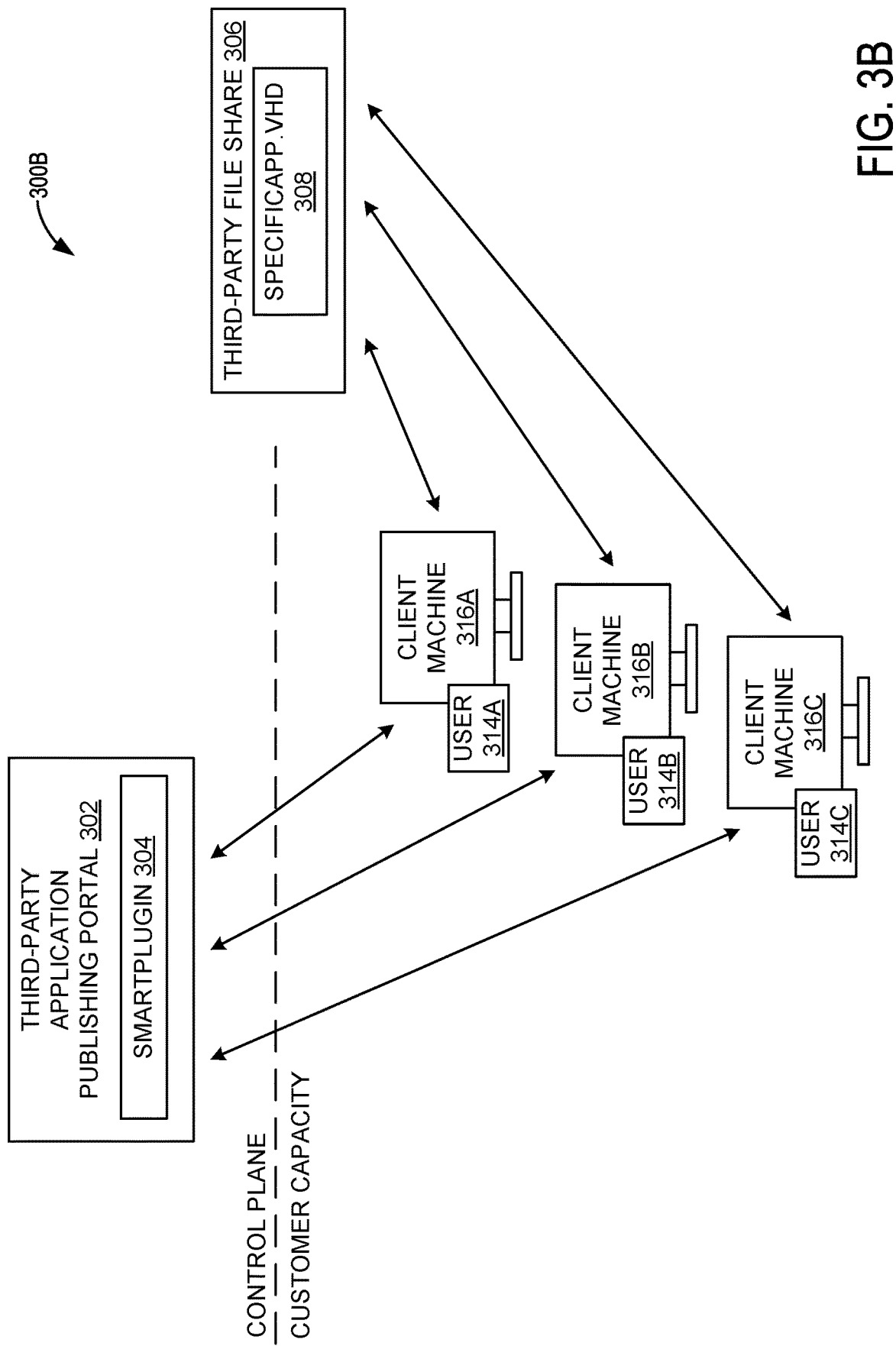
FIG. 3B illustrates application delivery to client machines in an example architecture, such as that of FIG. 1.

Referring next to FIG. 3B, application delivery to multiple client machines is illustrated. An application packager creates an application plugin (e.g., SmartPlugin 304) for an application (e.g., SpecificApp.VHD 308). The SmartPlugin 304 is published on a third-party application publishing portal 302 and the SpecificApp.VHD 308 is stored on an application repository (e.g., third-party file share 306). The third-party file share 306 may or may not be under control of the entity that controls the third-party application publishing portal 302 (e.g., the third-party application publishing portal 302 may be managed by an entity that is different than an entity managing the application manager on the client machine).

The SmartPlugin 304 may be assigned to users (e.g., such as users 314A-314C). The number of users to whom the SmartPlugin 304 is assigned may be in the hundreds, thousands, or even more. When these users log in into their client machines (e.g., client machines 316A-316C), only the SmartPlugin 304 is downloaded from the third-party application publishing portal 302 and processed on each client machine 316A-316C. The SmartPlugin 304 may be used, directly or with the help of application manager, to access the SpecificApp.VHD 308 stored in the third-party file share 306. The SpecificApp.VHD 308 is then made available to the users 314A-314C without actually downloading the whole application on each client machine 316A-316C. This is accomplished using, for example, virtual on-demand delivery of SpecificApp.VHD 308.

The example of FIG. 3B illustrates how multiple machines access the same application on the application repository 106 yet avoid the need to download the full application on every single machine. This generates significant savings in both storage and time required for application delivery.

Figure 4A:
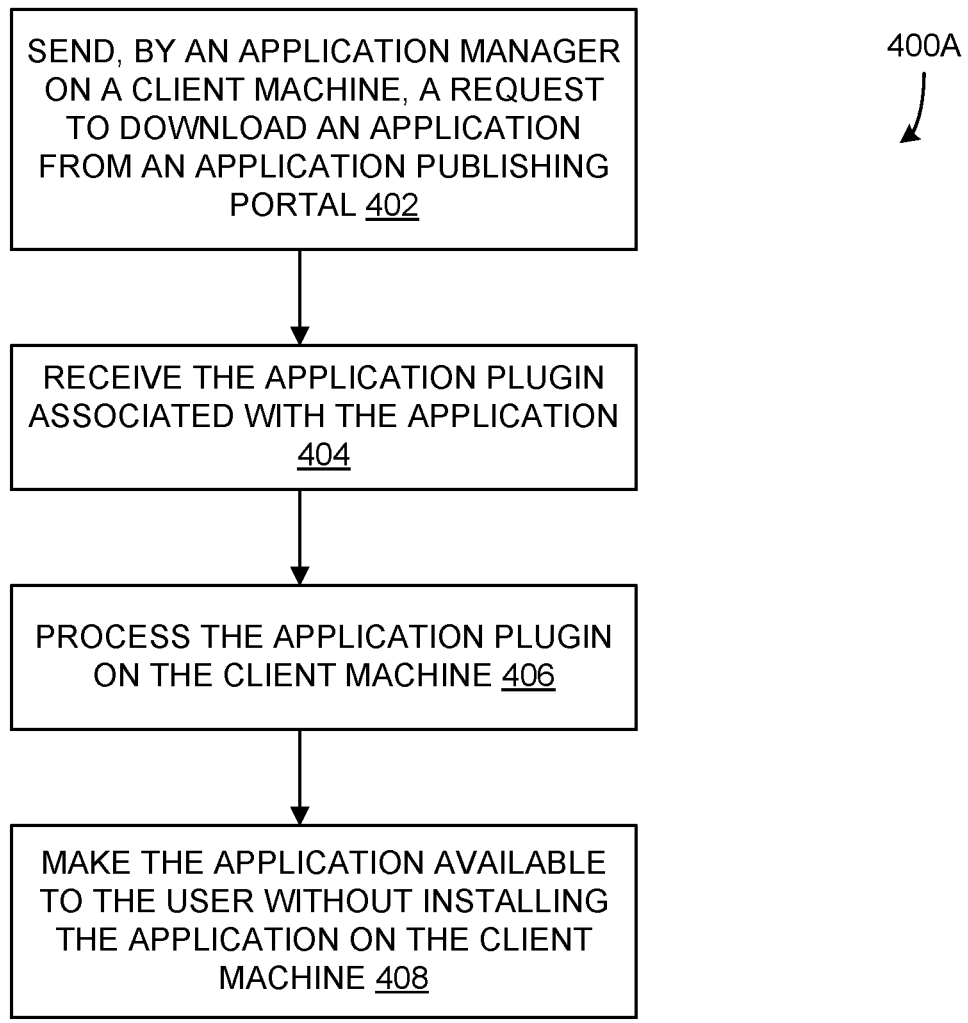
FIG. 4A is a flowchart illustrating an example method for receiving applications in a third-party environment, such as that of FIG. 1.

FIG. 4A is a flowchart illustrating an example method 400A for delivering applications in third-party environments in the architecture of FIG. 1. At 402, an application manager, such as application manager 118 on a client machine 116, sends a request to download an application from an application publishing portal that stores an application plugin associated with the application. The application plugin is a fraction of a size of the associated application. The application itself is stored in an application repository by an application packager. At 404, in response to the request to download the application, the application plugin 104 associated with the application is received from the application publishing portal 102. At 406, the application plugin 104 is processed on the client machine 116 by the application manager 118. The application plugin 104 comprises metadata and instructions to locate the application on the application repository. At 408, the application is made available to the user 114 without installing the application on the client machine 116. For example, the application is made available to the user 114 without downloading the application to the client machine 116.

Figure 4B:
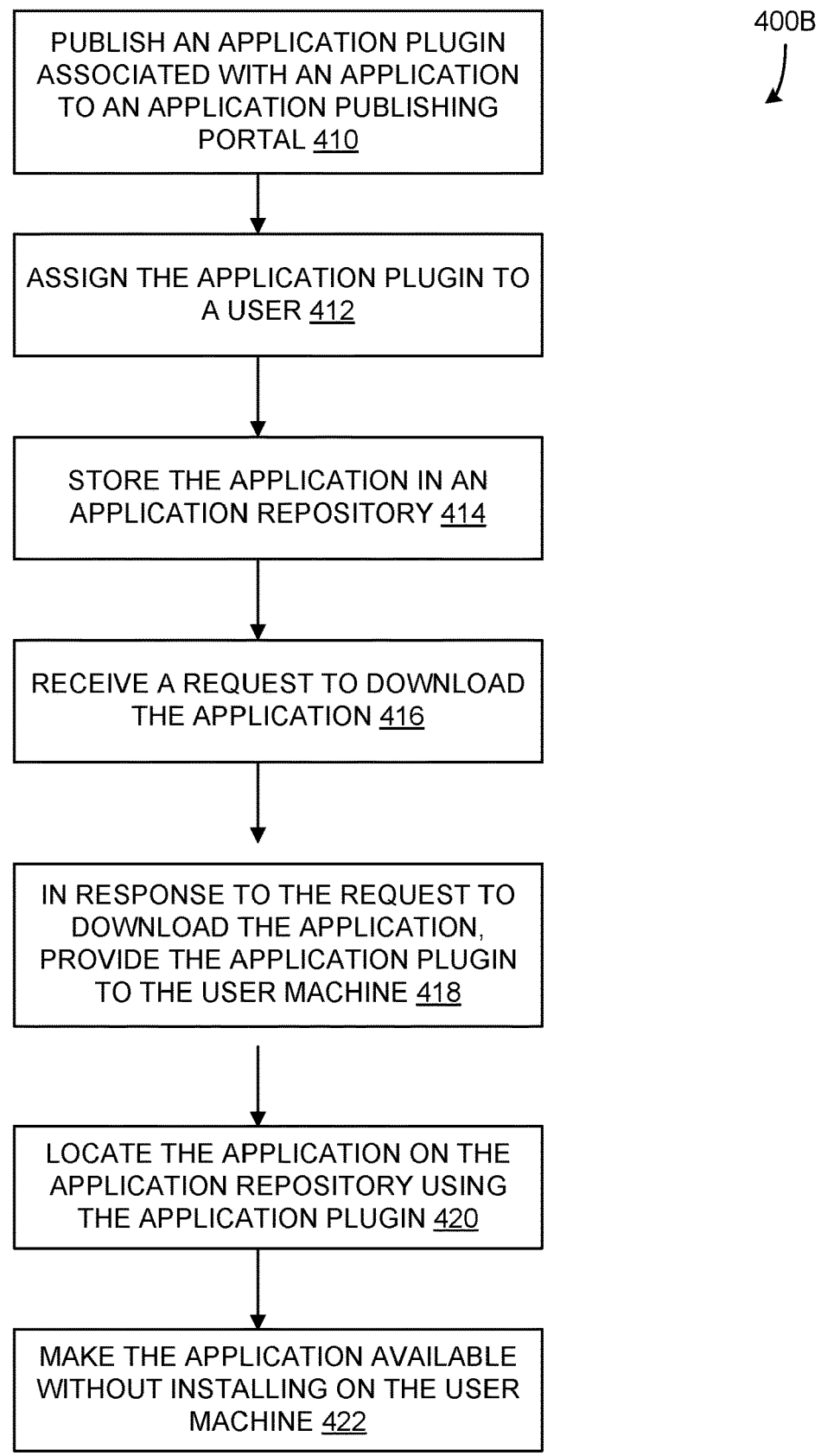
FIG. 4B is a flowchart illustrating an example method for delivering applications in a third-party environment, such as that of FIG. 1.

FIG. 4B is a flowchart illustrating an example method 400B for delivering applications in third-party environments. At 410, an application plugin (e.g., application plugin 104) associated with an application is published to an application publishing portal (e.g., application publishing portal 102). The application plugin 104 is assigned to a user (e.g., user 114) at 412 and the application is stored in an application repository (e.g., application repository 106) at 414.

In some examples, the application plugin 104, which includes metadata and instructions, is in a format that the application publishing portal 102 accepts. The application plugin 104 may be created, by the application packager, to correspond to any application format or type, making it possible to publish different application formats using the application plugin 104 as long as the application format can be identified and used by a client machine (e.g., client machine 116). For example, the format of application plugin 104 may be .vhd, .vhdx, .msi, .msix, "app-v", "pin-app", etc.

At 416, a request to download the application is received from the client machine 116. In response to the request to download the application, the application plugin 104 is provided to the client machine 116 at 418. The application plugin 104 encapsulates the metadata and/or instructions. The metadata in the application plugin 104 describes the application package including, for example, application package identifier, application VHD name, relative location of the application on the file share (e.g., the application repository 106), etc. The instructions part of the application plugin 104 includes, for example, computer-executable instructions that when executed by a processor trigger execution of an application manager (e.g., application manager 118). In some examples, the instructions are in the form of an RPC call exposed by the application manager 118 executable for handling such a functionality. The RPC endpoint may also accept the metadata related to the application.

At 420, the application is located on the application repository 106 using the application plugin 104. For example, the application manager 118 uses the metadata in the application plugin 104 to know that the application (e.g., the .vhd file of the application) is located at the application repository 106, as well as where the application is located in the application repository 106 (e.g., a relative path). An application may exist in multiple package formats (e.g., .vhd, .vhdx, .msi, .msix, etc.). Applications may also be in common formats like ThinApp, Microsoft MSIX, App-V etc. or any formats. When delivering other application formats, the application plugin 104 may have different metadata to describe the application. In some use cases, the instructions encapsulated in the application plugin might also trigger an RPC end point in the application manager that lets the application manager decide what application format to choose from the application repository 106 depending on the environment it is running in. In some examples, this is done by providing details identifying the application (e.g., application globally unique identifier, name, etc.) but not specifying the format type. The communication between application plugin and application manager may also be done using mechanisms other than an RPC call into the process.

In some examples, there are additional RPC endpoints exposed by the application manager 118 components (e.g., svservice) to facilitate making the application available without installation of the application.

The application manager 118 then processes all this information passed into the RPC endpoint, and makes the application available from the application repository 106 at 422. The application manager 118 makes the application available on the client machine 116 without downloading the application from either the application publishing portal 102 or the application repository 106. Rather, the application is made available virtually on-demand (e.g., by mounting a virtual disk).

In some examples, the instructions in the application plugin 104 may call the application manager 118 which is then run to virtualize the application on the client machine 116. In some other examples, if the application manager 118 is not available on the client machine 116, the application plugin 104 uses the metadata and/or instructions therein to download and install the application manager 118 relevant to the execution environment of the client machine 116. Thereafter, the application manager 118 may use the application plugin 104 to virtualize the application on the client machine 116. In some other examples, if the application manager 118 is not available on the client machine 116, the metadata and/or instructions in the application plugin 104 may be directly used to virtualize the application on the client machine 116 without requiring the application manager 118.

In some cases, instead of virtually delivering the application, the application is completely installed on the machine. In such instances, the application plugin 104 works with the application manager 118 to install the application on the client machine 116. For example, the application plugin 104 finds the application installer format (e.g., .msi etc.) on the application repository 106 in situations where an install of the application on the client machine 116 is needed, and installs the application on the client machine 116. The decision to install the application on the client machine 116 may be made at runtime depending on the environment the application plugin 104 is delivered in.

Figure 5:
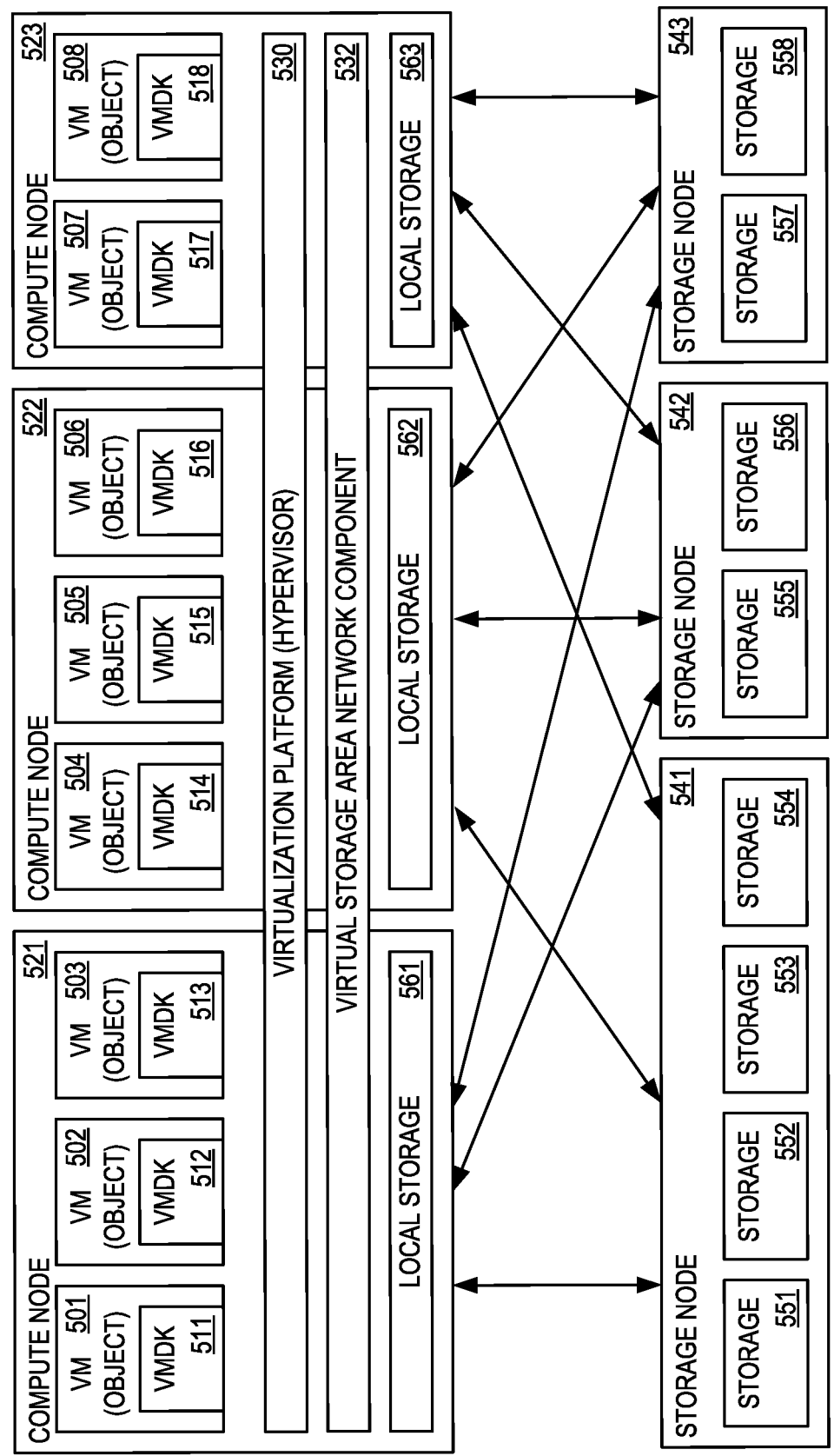
FIG. 5 illustrates an example virtualization architecture that may be used as a computing platform.

Examples of architecture 100 are operable with virtualized and non-virtualized storage solutions. FIG. 5 illustrates a virtualization architecture 500 that may be used. Virtualization architecture 500 is comprised of a set of compute nodes 521-523, interconnected with each other and a set of storage nodes 541-543 according to an embodiment. In other examples, a different number of compute nodes and storage nodes may be used. Each compute node hosts multiple objects, which may be virtual machines (VMs, such as base objects, linked clones, and independent clones), containers, applications, or any compute entity (e.g., computing instance or virtualized computing instance) that consumes storage, such as local storage 561, 562, 563 (e.g., storage devices directly attached to the compute nodes 521, 522, 523) or storage provided by other devices or services (e.g., SAN storage, network-attached storage (NAS), cloud storage, storage provided by storage nodes 541, 542, 543, or the like). When objects are created, they may be designated as global or local, and the designation is stored in an attribute. For example, compute node 521 hosts objects 501, 502, and 503; compute node 522 hosts objects 504, 505, and 506; and compute node 523 hosts objects 507 and 508. Some of objects 501-508 may be local objects. In some examples, a single compute node may host 50, 100, or a different number of objects. Each object uses a VM disk (VMDK), for example VMDKs 511-518 for each of objects 501-508, respectively. Other implementations using different formats are also possible. A virtualization platform 530, which includes hypervisor functionality at one or more of compute nodes 521, 522, and 523, manages objects 501-508. In some examples, various components of virtualization architecture 500, for example compute nodes 521, 522, and 523, and storage nodes 541, 542, and 543 are implemented using one or more computing apparatus such as computing apparatus 618 of FIG. 6.

Virtualization software that provides software-defined storage (SDS), by pooling storage nodes across a cluster, creates a distributed, shared data store, for example a storage area network (SAN). Thus, objects 501-508 may be virtual SAN (vSAN) objects. In some distributed arrangements, servers are distinguished as compute nodes (e.g., compute nodes 521, 522, and 523) and storage nodes (e.g., storage nodes 541, 542, and 543). Although a storage node may attach a large number of storage devices (e.g., flash, solid state drives (SSDs), non-volatile memory express (NVMe), Persistent Memory (PMEM), quad-level cell (QLC)) processing power may be limited beyond the ability to handle input/output (I/O) traffic. Storage nodes 541-543 each include multiple physical storage components, which may include flash, SSD, NVMe, PMEM, and QLC storage solutions. For example, storage node 541 has storage 551, 552, 552, and 553; storage node 542 has storage 555 and 556; and storage node 543 has storage 557 and 558. In some examples, a single storage node may include a different number of physical storage components.

Storage nodes 541-543 are treated as a SAN with a single global object, enabling any of objects 501-508 to write to and read from any of storage 551-558 using a virtual SAN component 532. Virtual SAN component 532 executes in compute nodes 521-523. Using the disclosure, compute nodes 521-523 are able to operate with a wide range of storage options. In some examples, compute nodes 521-523 each include a manifestation of virtualization platform 530 and virtual SAN component 532. Virtualization platform 530 manages the generating, operations, and clean-up of objects 501 and 502. Virtual SAN component 532 permits objects 501 and 502 to write incoming data from object 501 and incoming data from object 502 to storage nodes 541, 542, and/or 543, in part, by virtualizing the physical storage components of the storage nodes.

Additional Examples

In some examples, the application plugin is used to make the application unavailable to the user on the client machine. That is, processing the application plugin results in disabling execution of the application on the client machine, or otherwise removing access to the application (e.g., making the application no longer available on-demand).

An example computerized method for delivering an application in a third-party environment comprises: sending, by an application manager on a client machine to an application publishing portal, a request to download the application from the application publishing portal, wherein the application publishing portal publishes an application plugin associated with the application, wherein the application plugin is a fraction of a size of the application, wherein the application is stored in an application repository by an application packager; in response to the request to download the application, receiving, from the application publishing portal, the application plugin associated with the application; processing, by the application manager, the application plugin on the client machine, the application plugin comprising metadata and instructions to locate the application on the application repository; and using one or more of the metadata and the instructions, making the application available to the user without installing the application on the client machine.

An example computer system for delivering an application in a third-party environment comprises: a processor; and a non-transitory computer readable medium having stored thereon program code executable by the processor, the program code causing the processor to: publish an application plugin associated with the application to an application publishing portal associated with the third-party environment, wherein the application plugin is a fraction of a size of the application; assign the application plugin to a user; store the application in an application repository; receive, from a client machine, a request to download the application; and in response to the request to download the application, provide the application plugin to the client machine, the application plugin comprising metadata and instructions to locate the application on the application repository and make the application available to the user without installing the application on the client machine.

An example non-transitory computer storage medium has stored thereon program code executable by a processor, the program code embodying a program code method for delivering an application in a third-party environment comprising: publishing an application plugin associated with the application to an application publishing portal associated with the third-party environment, wherein the application plugin is a fraction of a size of the application; assigning the application plugin to a user; storing the application in an application repository; receiving, from a client machine, a request to download the application; and in response to the request to download the application, providing the application plugin to the client machine, the application plugin comprising metadata and instructions to locate the application on the application repository and make the application available to the user without installing the application on the client machine.

Alternatively, or in addition to the other examples described herein, examples include any combination of the following:

- the application packager publishes the application plugin on the application publishing portal, the method further comprising: creating, by the application packager, the application plugin in a format supported by the application publishing portal.
- the application plugin is automatically downloaded on the client machine upon detecting a login into the client machine by the user.
- the application is available to the user of the client machine in real time upon detecting the login into the client machine by the user.
- the application plugin makes a procedure call to the application manager, wherein the application manager locates the application on the application repository and makes the application available from the application repository to the client machine.
- determining, by the application plugin, that the application manager is not available on the client machine; and based on the determining, making, by the application plugin, the application available on the client machine from the application repository
- creating, by the application packager, the application plugin for the application.
- the metadata describes the application and includes a location of the application in the application repository.
- the metadata is in JavaScript Object Notation (JSON) format or Extensible Markup Language (XML) format.
- the instructions in the application plugin comprise executable instructions that trigger execution of the application manager on the client machine.
- the instructions in the application plugin comprise executable instructions that trigger a remote procedure call (RPC) end point in the application manager, wherein the application manager selects, based on the RPC end point, an application format from the application repository depending on an execution environment of the application plugin on the client machine.
- the application plugin is used to make the application unavailable to the user on the client machine.
- the request for the application plugin is automatically generated by the client machine upon detecting a login into the client machine by the user.
- the application is available to the user of the client machine in real time upon detecting the login into the client machine by the user.

Exemplary Operating Environment

Figure 6:
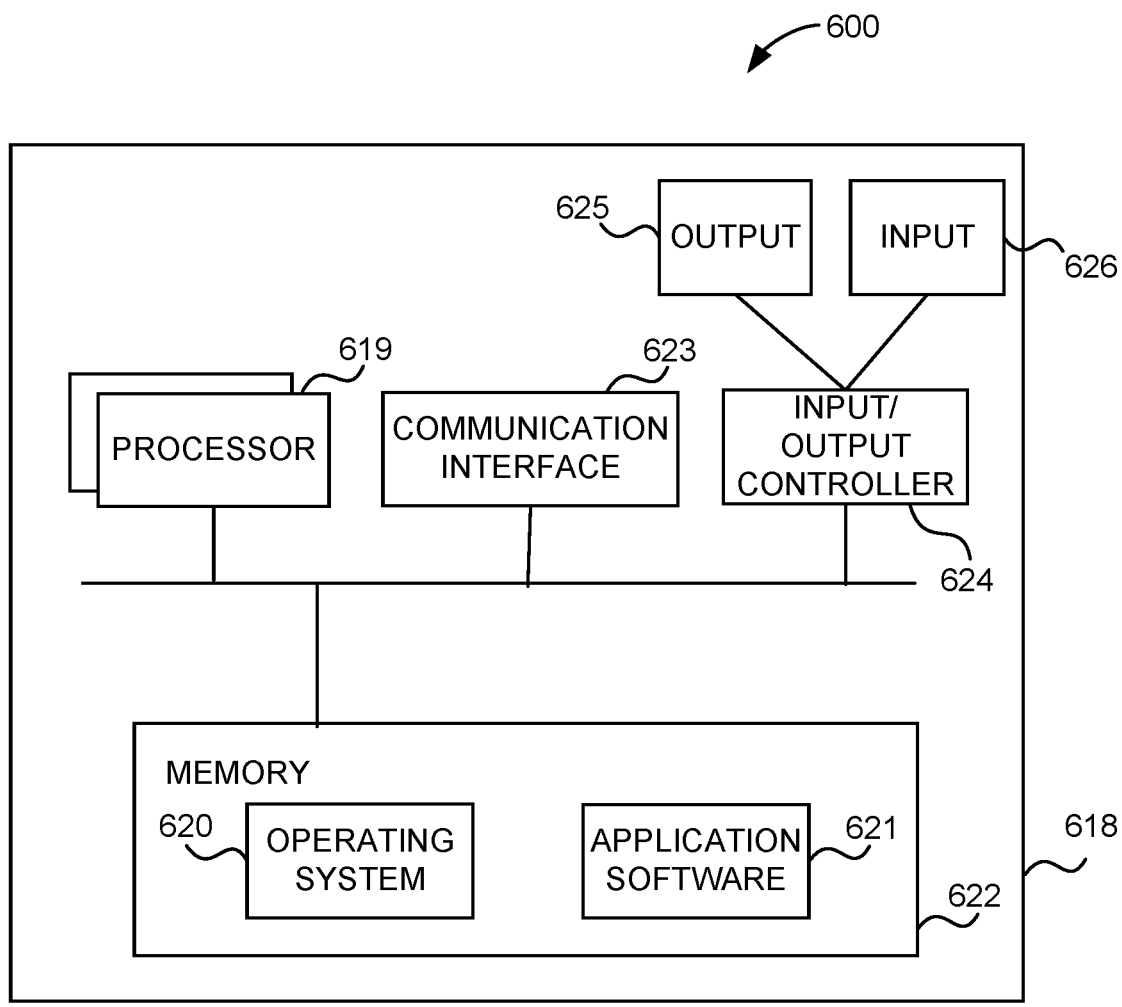
FIG. 6 illustrates a block diagram of an example computing apparatus that may be used as a component of an example architecture, such as the architectures of FIG. 1 and FIG. 5.

The present disclosure is operable with a computing device (computing apparatus) according to an embodiment shown as a functional block diagram 600 in FIG. 6. FIG. 6 illustrates a block diagram of an example computing apparatus that may be used as a component of the architectures of FIG. 1 and FIG. 5. In an embodiment, components of a computing apparatus 618 are implemented as part of an electronic device according to one or more embodiments described in this specification. The computing apparatus 618 comprises one or more processors 619 which may be microprocessors, controllers, or any other suitable type of processors for processing computer executable instructions to control the operation of the electronic device. Alternatively, or in addition, the processor 619 is any technology capable of executing logic or instructions, such as a hard-coded machine. Platform software comprising an operating system 620 or any other suitable platform software may be provided on the computing apparatus 618 to enable application software 621 to be executed on the device. According to an embodiment, the operations described herein may be accomplished by software, hardware, and/or firmware.

Computer executable instructions may be provided using any computer-readable medium (e.g., any non-transitory computer storage medium) or media that are accessible by the computing apparatus 618. Computer-readable media may include, for example, computer storage media such as a memory 622 and communications media. Computer storage media, such as a memory 622, include volatile and non-volatile, removable, and non-removable media implemented in any method or technology for storage of information such as computer readable instructions, data structures, program modules or the like. Computer storage media include, but are not limited to, hard disks, RAM, ROM, EPROM, EEPROM, NVMe devices, persistent memory, phase change memory, flash memory or other memory technology, compact disc (CD, CD-ROM), digital versatile disks (DVD) or other optical storage, magnetic cassettes, magnetic tape, magnetic disk storage, shingled disk storage or other magnetic storage devices, or any other non-transmission medium (e., non-transitory) that can be used to store information for access by a computing apparatus. In contrast, communication media may embody computer readable instructions, data structures, program modules, or the like in a modulated data signal, such as a carrier wave, or other transport mechanism. As defined herein, a computer storage medium or media does not include communication media. Therefore, a computer storage medium or media does not include propagating signals. Propagated signals are not examples of computer storage media. Although the computer storage medium (the memory 622) is shown within the computing apparatus 618, it will be appreciated by a person skilled in the art, that the storage may be distributed or located remotely and accessed via a network or other communication link (e.g., using a communication interface 623). Computer storage media are tangible, non-transitory, and are mutually exclusive to communication media.

The computing apparatus 618 may comprise an input/output controller 624 configured to output information to one or more output devices 625, for example a display or a speaker, which may be separate from or integral to the electronic device. The input/output controller 624 may also be configured to receive and process an input from one or more input devices 626, for example, a keyboard, a microphone, or a touchpad. In one embodiment, the output device 625 also acts as the input device. An example of such a device may be a touch sensitive display. The input/output controller 624 may also output data to devices other than the output device, e.g., a locally connected printing device. In some embodiments, a user may provide input to the input device(s) 626 and/or receive output from the output device(s) 625.

The functionality described herein can be performed, at least in part, by one or more hardware logic components. According to an embodiment, the computing apparatus 618 is configured by the program code when executed by the processor 619 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special purpose computing device when programmed to execute the instructions described herein. The detailed description provided above in connection with the appended drawings is intended as a description of a number of embodiments and is not intended to represent the only forms in which the embodiments may be constructed, implemented, or utilized. Although these embodiments may be described and illustrated herein as being implemented in devices such as a server, computing devices, or the like, this is only an exemplary implementation and not a limitation. As those skilled in the art will appreciate, the present embodiments are suitable for application in a variety of different types of computing devices, for example, PCs, servers, laptop computers, tablet computers, etc.

The term "computing device" and the like are used herein to refer to any device with processing capability such that it can execute instructions. Those skilled in the art will realize that such processing capabilities are incorporated into many different devices and therefore the terms "computer", "server", and "computing device" each may include PCs, servers, laptop computers, mobile telephones (including smart phones), tablet computers, and many other devices. Any range or device value given herein may be extended or altered without losing the effect sought, as will be apparent to the skilled person. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While no personally identifiable information is tracked by aspects of the disclosure, examples may have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," and "the" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computerized method for delivering an application to a client machine in a third-party environment, the computerized method comprising:
    sending, by an application manager on the client machine to an application publishing portal associated with the third-party environment, a request to download the application from the application publishing portal, wherein an application plugin associated with the application is published by the application publishing portal, wherein the application is stored in an application repository;
    in response to the request to download the application from the application publishing portal, receiving, from the application publishing portal, the application plugin associated with the application;
    executing, by the application manager, the application plugin associated with the application on the client machine, wherein the application plugin associated with the application comprises metadata and instructions to locate the application on the application repository; and
    using, by the application manager, the metadata and the instructions to cause the application to become available to a user of the client machine on-demand without downloading the application to the client machine from the application publishing portal or the application repository.

2. The computerized method of claim 1, wherein an application packager publishes the application plugin associated with the application on the application publishing portal, the computerized method further comprising:
    creating, by the application packager, the application plugin associated with the application in a format supported by the application publishing portal.

3. The computerized method of claim 1, wherein the application plugin associated with the application is automatically downloaded to the client machine upon detecting a login into the client machine by the user.

4. The computerized method of claim 3, wherein the application is available to the user of the client machine in real time upon detecting the login into the client machine by the user.

5. The computerized method of claim 1, wherein the application plugin associated with the application makes a procedure call to the application manager, and wherein the application manager locates the application in the application repository and makes the application available from the application repository to the client machine.

6. The computerized method of claim 1, further comprising:
    determining, by the application plugin associated with the application, that the application manager is not available on the client machine; and
    based on the determining, making, by the application plugin associated with the application, the application available on the client machine from the application repository without use of the application manager.

7. The computerized method of claim 1, further comprising:
    creating, by an application packager, the application plugin associated with the application.

8. The computerized method of claim 1, wherein the metadata describes the application including a location of the application in the application repository.

9. The computerized method of claim 1, wherein the metadata is in JavaScript Object Notation (JSON) format or Extensible Markup Language (XML) format.

10. The computerized method of claim 1, wherein the instructions in the application plugin associated with the application comprise executable instructions that trigger execution of the application manager on the client machine.

11. The computerized method of claim 1, wherein the instructions in the application plugin associated with the application comprise executable instructions that trigger a remote procedure call (RPC) end point in the application manager.

12. The computerized method of claim 11, wherein the application manager selects, based on the RPC end point, an application format from the application repository depending on an execution environment of the application plugin associated with the application on the client machine.

13. The computerized method of claim 1, wherein the application plugin associated with the application includes instructions to make the application unavailable to the user on the client machine.

14. A computer system for delivering an application to a client machine in a third-party environment, the computer system comprising:
    a processor; and
    a non-transitory computer storage medium having stored thereon program code executable by the processor, the program code causing the processor to:
        publish an application plugin associated with the application to an application publishing portal associated with the third-party environment;
        assign the application plugin associated with the application to a user of the client machine;
        store the application in an application repository;
        receive, from the client machine, a request to download the application from the application publishing portal; and in response to the request to download the application from the application publishing portal, provide the application plugin associated with the application to the client machine, wherein the application plugin associated with the application comprises metadata and instructions to locate the application on the application repository, and wherein an application manager executes the application plugin associated with the application and uses the metadata and the instructions to cause the application to become available to the user of the client machine on-demand without downloading the application to the client machine from the application publishing portal or the application repository.

15. The computer system of claim 14, wherein the program code further causes the processor to create the application plugin associated with the application in a format required by the application publishing portal.

16. The computer system of claim 14, wherein the application is made available to the user of the client machine in real time upon detecting a login into the client machine by the user.

17. The computer system of claim 14, wherein the application plugin associated with the application is a fraction of a size of the application.

18. A non-transitory computer storage medium having stored thereon program code executable by a processor, the program code embodying a program code method for delivering an application to a client machine in a third-party environment comprising:

publishing an application plugin associated with the application to an application publishing portal associated with the third-party environment;

assigning the application plugin associated with the application to a user of the client machine;

storing the application in an application repository;

receiving, from the client machine, a request to download the application from the application publishing portal; and in response to the request to download the application from the application publishing portal, providing the application plugin associated with the application to the client machine, wherein the application plugin associated with the application comprises metadata and instructions to locate the application on the application repository, and wherein an application manager executes the application plugin associated with the application and uses the metadata and the instructions to cause the application to become available to the user of the client machine on-demand without downloading the application to the client machine from the application publishing portal or the application repository.

19. The non-transitory computer storage medium of claim 18, wherein the program code method further comprises creating the application plugin associated with the application in a format required by the application publishing portal.

20. The non-transitory computer storage medium of claim 19, wherein the application plugin associated with the application is not a portion of the application.

* * * * *